United States Patent [19]

Baer

[11] 4,395,045
[45] Jul. 26, 1983

[54] TELEVISION PRECISION TARGET SHOOTING APPARATUS AND METHOD

[75] Inventor: Ralph H. Baer, Manchester, N.H.

[73] Assignee: Sanders Associates, Inc., Nashua, N.H.

[21] Appl. No.: 159,530

[22] Filed: Jun. 16, 1980

[51] Int. Cl.³ ............................................. A63F 9/22
[52] U.S. Cl. .................................. 273/312; 273/313; 273/DIG. 28; 434/20; 434/22
[58] Field of Search ...................... 273/85 G, 310–316, 273/DIG. 28; 358/93; 364/410; 340/323–325; 434/20, 22, 21

[56] References Cited

U.S. PATENT DOCUMENTS

| Re. 28,507 | 10/1975 | Rausch | 273/DIG. 28 |
| Re. 28,598 | 10/1975 | Baer et al. | 273/DIG. 28 |
| 2,502,834 | 4/1950 | Dreyer | 273/316 |
| 3,599,221 | 8/1971 | Baer | 273/DIG. 28 |
| 3,728,480 | 4/1973 | Baer | 273/DIG. 28 |
| 3,829,095 | 8/1974 | Baer | 273/DIG. 28 |
| 3,964,178 | 6/1976 | Marshall et al. | 434/22 |
| 4,053,740 | 10/1977 | Rosenthal | 273/85 G |
| 4,068,847 | 1/1978 | Lukkarila et al. | 273/85 G |
| 4,086,711 | 5/1978 | Gammarino et al. | 434/22 |
| 4,111,421 | 9/1978 | Mierzwinski | 273/85 G |
| 4,126,851 | 11/1978 | Okor | 273/DIG. 28 |
| 4,177,462 | 12/1979 | Chung | 273/DIG. 28 |
| 4,210,329 | 7/1980 | Steiger et al. | 273/313 |

Primary Examiner—Vance Y. Hum
Attorney, Agent, or Firm—Louis Etlinger; Richard I. Seligman

[57] ABSTRACT

Simulated shooting at displayed images on the screen of a television receiver using an untethered, simulated gun provides indication on the screen of where the gun was pointed at the time of trigger pull. This is achieved by flashing the screen white subsequent a trigger pull in order that a photosensor within the gun will be responsive to short segments of horizontal raster lines such that by counting vertical lines and time intervals with respect to vertical and horizontal synchronization pulses, respectively, identification of where on the screen the gun was pointing is achieved, permitting a symbol to be displayed upon the screen at that location.

13 Claims, 9 Drawing Figures

TELEVISION PRECISION TARGET SHOOTING APPARATUS AND METHOD

BACKGROUND OF THE INVENTION

This invention relates to television games and training systems and more particularly to television target shooting games and training systems.

Television games providing photosensitive guns capable of sensing large, bright target symbols on the screen of a television receiver are well known and disclosed in U.S. Pat. Nos. 3,599,221; 3,728,480; 3,829,095; Re. 28,507 and Re. 28,598, all assigned to the assignee of the present application.

All of the target shooting games of the above-mentioned patents provide for the display of a distinct target spot on the screen of a television receiver which when imaged on a gunmounted, electro-optical sensor results in a series of output pulses indicating that the gun was indeed lined up properly with the target and, therefore, a "hit" had been scored. None of these systems attempted to show the user just where he was aiming when he pulled the trigger preceding a miss or for that matter how closely to the center of the target on screen he was aiming when he made a "hit".

Furthermore, all of these systems require relatively bright target spots, and if the targets are relatively dark it is difficult for the electro-optical sensor to detect the fact that a "hit" has been made.

These systems are further limited by the fact that the rifle is attached via a cable to some portion of the system limiting the mobility of the user in target shooting practice.

Accordingly, it is an object of the present invention to provide an improved means of shooting at displayed images on a television screen.

It is another object of this invention to permit shooting at a simulated target, displayed on a television screen, which may be relatively dark so as not to offer sufficient brightness to allow its detection by practical electro-optic sensing means.

It is a further object of this invention to enable the user to "shoot" at a target displayed on a television screen and have the impact point of the "projectile" displayed on the screen whether or not the target was in fact "hit".

It is yet another object of this invention to allow free standing, untethered operation of a simulated gun for a television target shooting system.

SUMMARY OF THE INVENTION

Briefly, a target shooting system, for playing games and/or for training, is provided which employs an untethered gun having an electro-optical sensor contained therein to "shoot" at images displayed on a television screen. The electrical output from the gun is applied to a video electronic system such as a video game or personal computer by an infrared transmitting subsystem.

The system does not require a displayed bright target as in prior art systems since upon receiving acknowledgement that the user has pulled the trigger of the gun, it causes brightening of the screen whereby the gun detects a portion of one or more raster scan lines from the white screen. In conjunction with synchronization signals, this information is used to calculate where the gun was pointed at the time of "firing" such that not only are "hits" indicated by the system but also misses.

The system further puts up on the screen of the television receiver an indication, such as a bright spot, where the gun was pointing. By viewing the screen the user can now determine readily if in fact a "hit" or miss was achieved and how close to the target was the "hit", which will permit the user on subsequent "firings" to realign the gun to improve capability at target shooting.

BRIEF DESCRIPTION OF THE DRAWINGS

The above-mentioned and other features and objects of this invention will become more apparent by reference to the following description taken into conjunction with the accompanying drawings, in which.

DESCRIPTION OF PREFERRED EMBODIMENTS

Figures 1, 2:
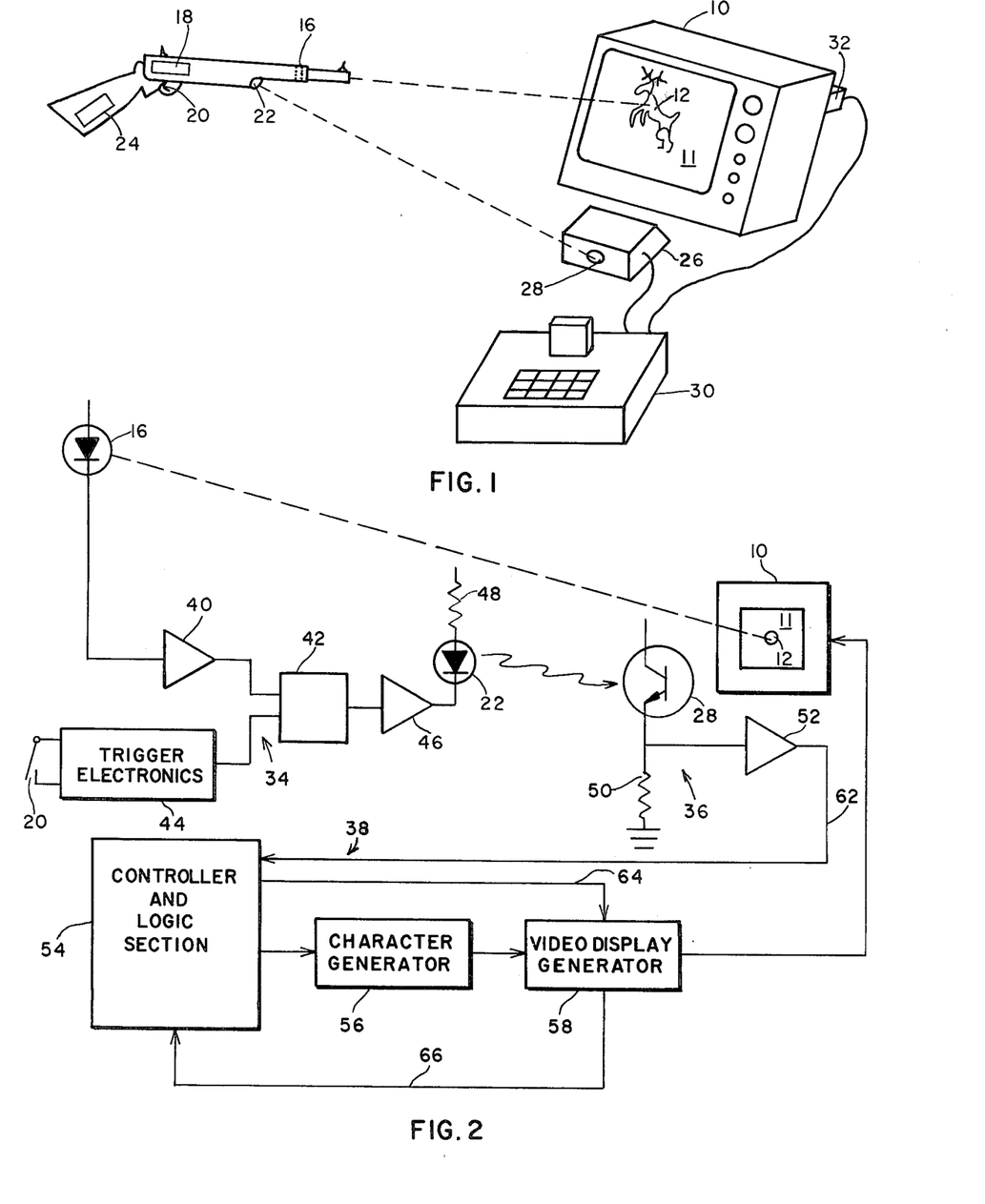
FIG. 1 is a pictorial view of a television precision target shooting system according to the invention.
FIG. 2 is a block diagram of the target shooting system of FIG. 1.

Referring now to FIG. 1 of the drawings, there is illustrated thereby one embodiment of a target shooting video system. This system is similar to video games presently being sold wherein a player, using a simulated rifle, aims the rifle at a symbol (target) displayed on a television receiver; "shoots" at the symbol; and if his rifle is aligned properly with such symbol, then an electro-optical sensor within the rifle will receive light from the displayed symbol indicating that a "hit" has been made. The primary difference of this system from those of the prior art video games is that in addition to indicating when "hits" are made, this system also indicates on the screen where the user was pointing his rifle when he "fired" it, whether or not he made a "hit". By using the techniques employed in this video shooting system, the point on the video screen where the user was pointing is indicated, thus, displaying "hits" and "misses".

The primary elements of this embodiment include a television receiver 10 having displayed on the screen 11 thereof a target symbol 12. While a television receiver is described as the preferred display in this embodiment, the invention also contemplates the substitution thereof of a television monitor wherein video signals would be applied to the monitor rather than RF signals as in the television receiver embodiment. The system also includes an actual but modified rifle or a simulated or (toy) rifle 14 which the user employs to "shoot" at the target symbol 12 displayed on the television receiver screen 11. In this embodiment, rifle 12 includes an electro-optical sensor 16 which is responsive to light received from the screen 11 of the television receiver. Sensor 16 is preferably positioned within and coaxial with the barrel of the rifle 14 and, preferably, near the breach end thereof. Rifle 14 also includes an electronic pulse amplifier 18 and a trigger and associated switch 20. An infrared (IR) transmitter 22 is also located on the rifle. Lastly, the rifle includes a power source such as a battery 24.

The system further includes an IR data receiver 26 having a photo-responsive element 28 thereon which is adapted to receive signals from the IR transmitter 22. A video electronics unit 30 receives its inputs from the IR data receiver 26 and applies an output to the television receiver 10, by way of connection 32 in conventional fashion, and supplies symbology for display on the screen of the television receiver. Video electronics unit 30 is typically a video game. However, other embodiments thereof will be described hereinafter.

Referring now to FIG. 2 of the drawings, there is shown in greater detail a block diagram of the overall target shooting system. In addition to the television receiver 10, the system includes three major electronic subsystems: the rifle electronics 34, the infrared data receiver 36 and the video electronics unit 38.

The rifle electronics 34 includes an electro-optical sensor 16, such as a photodiode, the output from which is supplied to an amplifier 40. The output from amplifier 40 is applied to a circuit 42 as one input thereto. Also contained as part of the rifle electronics is the trigger switch 20 coupled to trigger electronics circuit 44 and having an output to the circuit 42. The output from circuit 42 is coupled to a current amplifier 46. Circuit 42 permits a trigger-pull signal to be applied to current amplifier 46 which is coupled to IR transmitter 22, but inhibits amplifier 40 developed outputs from exciting transmitter 22 unless preceded by a trigger pull. A resistor 48 is employed to limit the peak pulse current through the IR transmitter 22. The resistor 48 thus determines (to a large extent) the range over which reliable infrared data communications can be obtained. By way of example, a demonstration unit constructed in accordance with the teachings of this invention, permits an eight foot distance between the IR transmitter 22 and the IR sensor 28 when the peak current of the diode 22 is approximately 300 milliamperes.

In addition to the phototransistor 28 the IR data receiver includes a resistor 50 and an amplifier 52.

The remaining portions of the system comprise a video game including a controller and logic section 54, a character generator 56 and a video display generator 58 for formatting the information to be displayed into raster scan configuration. The output signal from the video display generator 58 is applied to television receiver 10 via a connecting line 60.

The IR signals from the photodiode 22 to the phototransistor 28 are amplified and applied to the controller and logic section 54 of the video electronics unit 38. Each time the trigger switch 20 of the rifle 14 is actuated, an output pulse is generated which is applied to the photodiode 22 and transmitted to phototransistor 28. The first pulse received by phototransistor 28 and applied to the video electronics unit 38 via a line 62 will be recognized as an actuation of trigger 20. If desired, this pulse can be used to increment a numerical display on the screen of television receiver 10 which represents the number of rounds fired. This number would be generated in the same manner in which video games normally generate and display scores and other numerals on the screen of a television receiver. The numeral would be produced by character generator 56 and formatted for raster scan display by video display generator 58 in conventional fashion.

Upon receipt of the trigger-pull signal along line 62, the controller and logic section 54 causes an unblanking of the television screen via line 64. When this occurs, the electro-optical sensor 16 will "see" a bright screen area, which will cause it to output a series of pulses (corresponding to several raster scan-line portions simultaneously within its field of view). These pulses are applied to the video electronics unit 38 via amplifier 40, circuit 42, amplifier 46, photodiode transmitter 22, phototransistor 28 and amplifier 52. The leading edge of these pulses identifies the horizontal position of the area imaged by the rifle-mounted electro-optical sensor 16. For example, if the rifle is pointed at the center of the screen of receiver 10, the output pulses from amplifier 40 will occur approximately 25 microseconds after horizontal sync has occurred. The video electronics unit is arranged to count, for example, from 1 to 100 in one-half microsecond intervals. It can therefore identify and store the number of 0.5 microsecond intervals that have elapsed since the last horizontal sync pulse, and therefore, provide a numerical horizontal position value for the position on the screen where the rifle was pointing. This counting function is essentially the same as that employed to increment and store scores as is accomplished in every video game. The numerical value is temporarily stored. Simultaneously the video electronics unit 38 receives vertical sync via line 66 from the video display generator. This sync signal starts a counter which keeps track of which number line is being displayed. The "hit" signal from line 62 stops this counter. Thus, the place where the rifle was pointing is determined both horizontally and vertically to within a 1 to 2% accuracy. Note that flashing the screen of the television receiver for one field or frame appears to produce a very brief flash which for aesthetic purposes can be looked upon as the muzzle flash of the rifle.

Both coordinates of the portion of the screen the rifle was pointed at are now known to at least within 2 to 5%. Accordingly, the video electronics unit outputs a symbol within this area on the screen where the rifle was pointed indicating "hits" or "misses".

Furthermore, if a hit was made on a moving target whose position is known at all times, the video electronics unit can calculate the direction and amount of the target's motion, add these to the horizontal and vertical position information (coordinates) obtained above and keep the "hit" mark in place on the moving target within a reasonable degree of accuracy. This feature of obtaining the coordinates of a moving target is not part of this invention, but rather is disclosed in U.S. Patent Application Ser. No. 090,830, filed Nov. 1, 1979, now U.S. Pat. No. 4,359,223, for an Interactive Video Playback System.

Figure 3:
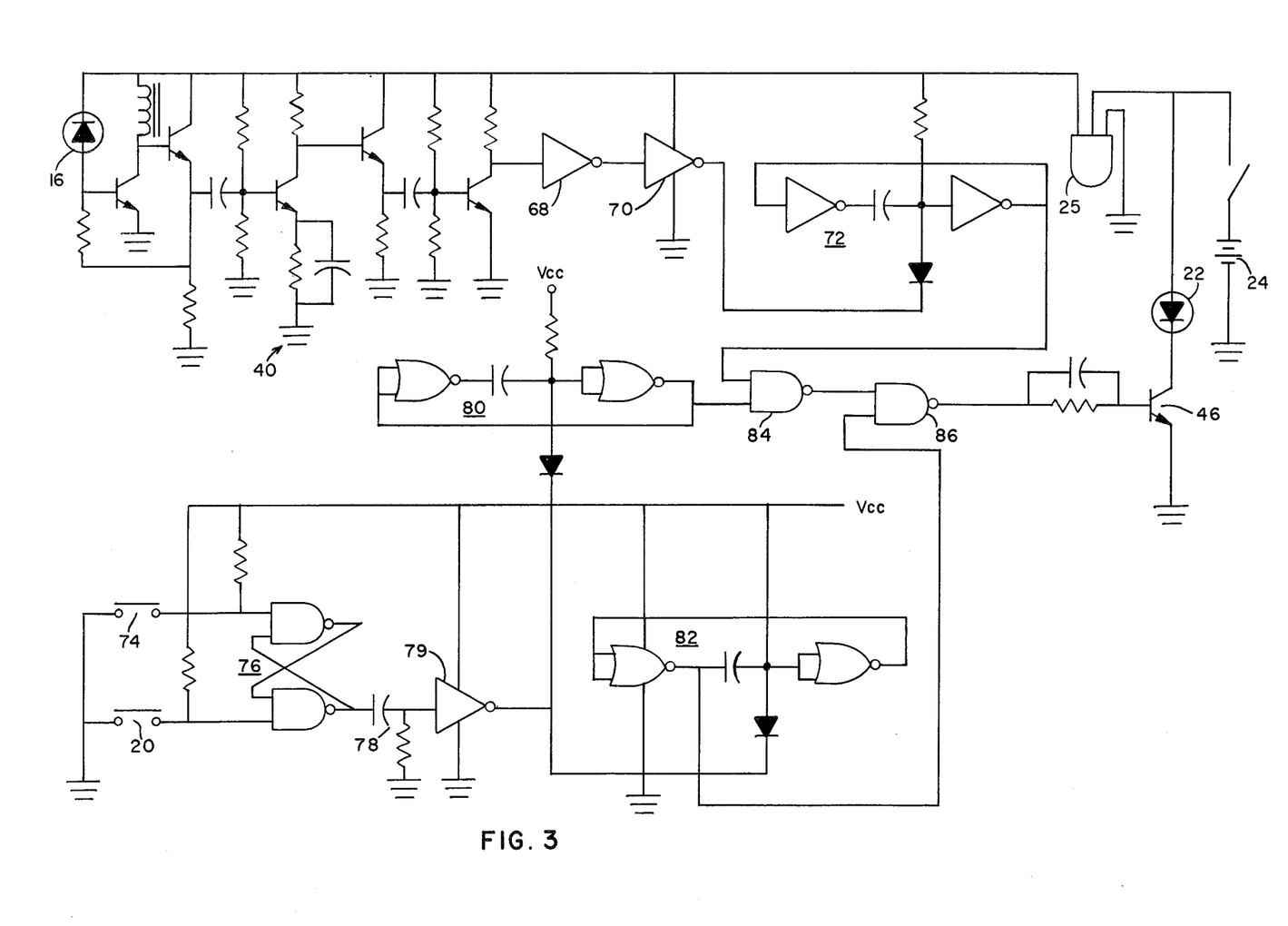
FIG. 3 is a schematic diagram of the electronics employed in the gun for the television target shooting system of FIGS. 1 and 2.

Referring now to FIG. 3 of the drawings, there is illustrated thereby a schematic diagram of the electronic circuitry built into the rifle 14. The circuitry of FIG. 3 corresponds to the rifle electronics 34 of FIG. 2 and includes electro-optical sensor 16, which is coupled to amplifier 40. The output of amplifier 40 is applied to logic inverters 68 and 70. The output from inverter 70 is coupled to a one-shot multivibrator 72.

The circuit further includes the trigger switch 20 and a reset switch 74 coupled to a set-reset-flip-flop (latch) 76. The output of latch 76 is applied to a differentiating circuit 78 and inverter 79, the output from which is applied to a pair of one-shot multivibrators 80 and 82. One-shot 80 is coupled to a NAND gate 84 having as a second input thereto the output from one-shot 72.

NAND gate 84 is coupled to a NAND gate 86 having as a second input thereto the output from one-shot 82. The output of NAND gate 86 is applied to the infrared emitting diode 22 via a transistor amplifier 46. Power is derived from battery 24 via a voltage regulator 25.

Electro-optical sensor 16, when aimed at the screen of the television receiver 10, subtends a screen area of approximately one-half inch by one-half inch by virtue of its location, in one embodiment, at the end of a barrel with a length of 24 inches and a bore of 0.2 inches, while the rifle to screen distance is approximately 4 to 5 feet.

Amplifier 40 raises the output of the sensor 16 to rail-to-rail levels when raster scan line segments of reasonable brightness are viewed by it. The logic inverters 68 and 70 square up the waveform and the output therefrom triggers one-shot multivibrator 72, which outputs a pulse of roughly 600 microseconds wide, that is, wide enough to produce a logic "1" (high) output (when triggered by the upper raster scan line segment viewed by the photodiode 16) which will last longer than the successive (1 or 2 microseconds wide) bursts resulting from the 10 or 20 raster line segments in view by the sensor 16.

The output of the circuit of FIG. 3 has been measured to have a rise time of less than a microsecond. Since the visible horizontal line raster scan time is approximately 50 microseconds, the determination of the time interval between horizontal sync and the leading edge of the signal from the one-shot 72 can fix its position on the screen (with respect to its left edge) to within 2%. When transistor amplifier 46 is turned on, it energizes the IR emitting diode 48.

When the rifle is first used, reset switch 74 is depressed momentarily. This sets latch 76 to its initial state. At that time one-shot 80 is also in its resting condition such that the output thereof is low and inhibits NAND gate 84 from passing any output pulses from the one-shot 72 that might result from pointing the rifle at bright portions of the screen. When the trigger 20 is pulled, closing the switch, the latch 76 is toggled which outputs a positive going transition via differentiating network 78 to inverter 79. The output from inverter 79 then goes negative briefly, triggering one-shot 82, the output from which goes "low" for approximately 2.5 microseconds and pulls one of NAND gate 86's inputs low for that period of time. This is a period roughly equal to 2% of a field interval. The negative pulse output from inverter 79 also triggers one-shot multivibrator 80 which develops a "high" output lasting for approximately 30 milliseconds (or a little less than two fields). It is during this period that pulses from the one-shot multivibrator 72, derived from the action of the photodiode circuit, can pass through NAND gate 84 which goes "low" during optical signal outputs from the one-shot multivibrator 72. This causes NAND gate 86 output to go "high" driving transistor 46 into saturation and causing the IR emitting diode 48 to emit another 250 microseconds wide pulse whose leading edge then provides the information required for horizontal target location, as described hereinbefore.

Figure 4:
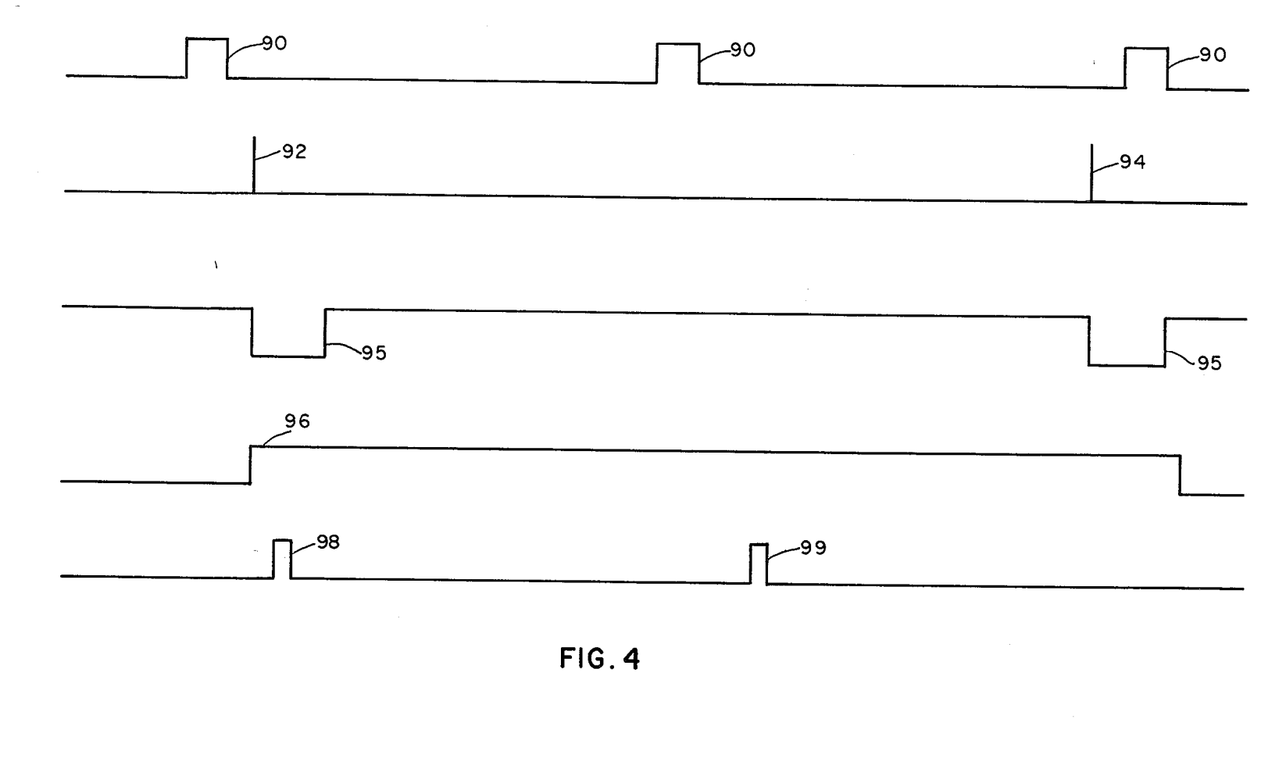
FIG. 4 is a number of waveforms illustrating the operation of the system of FIGS. 1 and 2.

FIG. 4 of the drawings illustrates the operation of the circuit of FIG. 3. Waveform A represents the vertical synchronization timing signal comprising pulses 90 and waveform B represents typical points in time when trigger switch 20 might be activated during a particular field. Pulse 92 of waveform B represents activation of the trigger near the top of the screen of television receiver 10 while pulse 94 represents activation of the trigger 20 when the raster is scanned near the bottom of the screen of the television receiver. Waveform C shows the resultant 250 microsecond pulses 95 from the output of the one-shot multivibrator 82 while waveform D shows the 30 millisecond gate generated by one-shot 80 during which optical pulses 98 and 99 (shown in waveform E) are passed.

The video electronics system 38 "looks" for a "high" signal from the line 62, FIG. 2, (which corresponds to the signal from one-shot 82 of FIG. 3). Then it "knows" that the trigger has just been depressed. The system is then cycled to wait until the next vertical field before it again "looks" at the output of the IR receiver 26. Then during this next field if a bright target has been imaged onto the rifle optics a signal from flip-flop 72 will be received by the IR receiver, detected and presented to the video electronic system. While signal 98 (waveform E of FIG. 4) will be ignored, signal 99 will be recognized as a target signal. The video electronics system meanwhile has been counting predetermined intervals starting with horizontal sync and therefore "knows" at what interval the received optical pulse has arrived. Thus, horizontal target location is identified. In addition, as described earlier, the video electronic system continuously monitors the number of horizontal lines scanned in each vertical interval (after vertical sync pulse starts). Hence it also "knows" the vertical position of the target.

Figure 5:
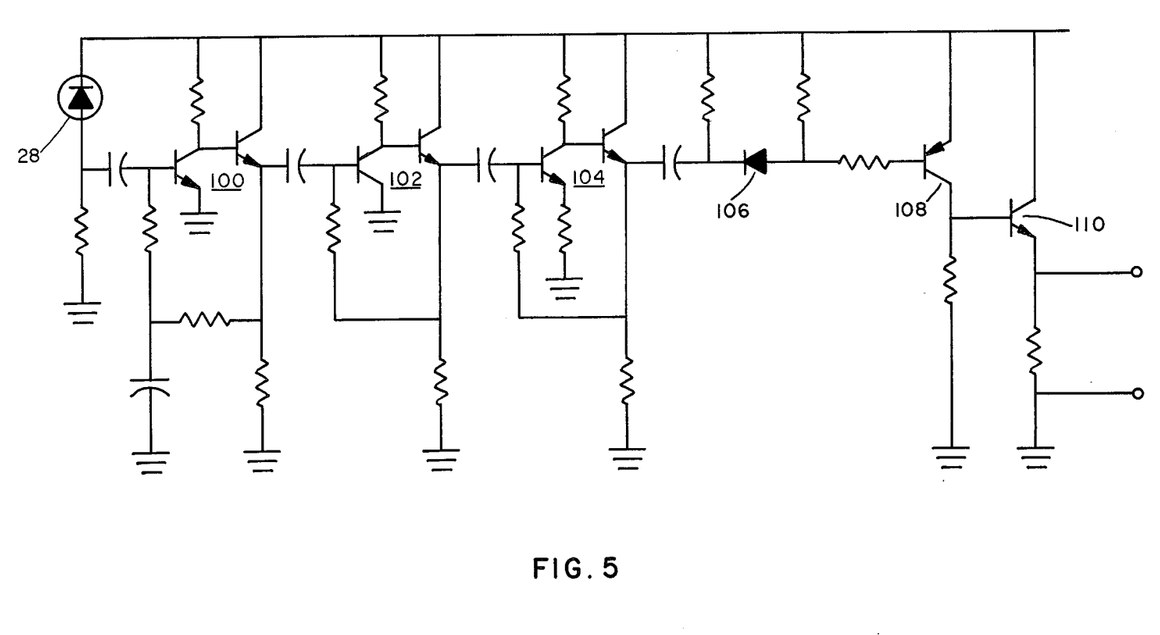
FIG. 5 is a schematic diagram of the infrared data receiver of the system of FIGS. 1 and 2.

Referring now to FIG. 5, there is illustrated thereby a schematic diagram of the IR receiver 36. It comprises a photodiode 28, the output from which is coupled to 3 stages of transconductance amplifier pairs 100, 102 and 104. The output of the last pair is applied to a biased diode 106 and then to a dc coupled amplifier 108 and emitter follower 110.

The transconductance amplifier pairs 100, 102 and 104 raise the signals from the photodiode 28 to a level sufficient to result in rail-to-rail square pulses. The biased diode 106 clips off base line noise and then passes the pulses through the amplifier 108 and emitter follower 110. This results in clean output logic level signal pulses with rise and fall times of less than 1 microsecond. These pulses are inputted to the video electronics system as described above which recognizes trigger and target pulses based on pulse width (duration) and/or real time occurrence, and subsequently records "hits" or "misses" by indicating the exact position on the screen of the television receiver at which the rifle was pointed and, accordingly, occasions the generation of a spot or other symbol on the screen of the television receiver at that position.

An alternate embodiment of the present invention employs a standard personal computer instead of the video electronic system 38. The computer provides all of the functions of the video electronic system including generation of the required synchronization pulses, screen unblanking pulse, video display generator circuitry and the character generator capability. The only problem in employing standard personal computers for this application is the fact that they are relatively slow and cannot be used at the present time to keep track of raster line numbers and (horizontal) incremental line intervals. Consequently, a hard wired high speed circuit board is employed in conjunction with the personal computer.

Figure 6:
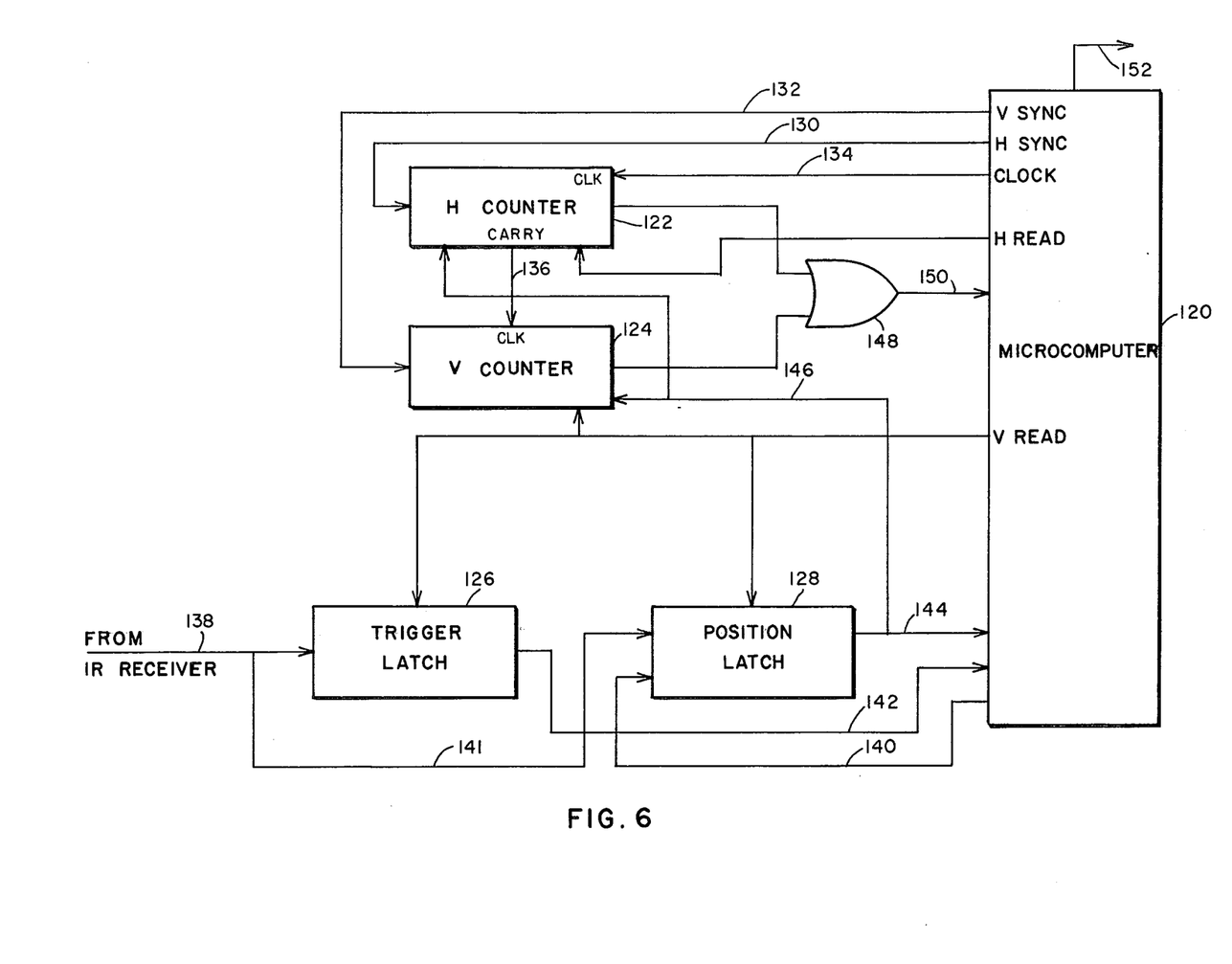
FIG. 6 is a block diagram of a video electronics unit which may be used in place of that set forth in FIG. 2 of the drawings.

That portion of the system, the high speed circuit board and the personal computer, is shown in FIG. 6 of the drawings. The circuit comprises a personal computer 120, a horizontal counter 122, a vertical counter 124, a trigger latch 126 and a position latch 128. The personal computer generates the horizontal and vertical synchronization signals which are applied to the horizontal and vertical counters, respectively, via lines 130 and 132. A clock signal from computer 120 is applied to the horizontal counter at the clock input thereto via a line 134. This is the internal clock for the computer which is typically 4 times chroma frequency or approximately 14 MHz. The clock input for the vertical counter 124 is received from the carry output of the horizontal counter 122 via a line 136. The carry output occurs at the normal horizontal line rate. Counter 124 can accumulate counts up to 263 lines and counter 122 can identify up to 364 time elements along any horizontal sweep interval.

The trigger latch 126 receives as the input thereto, via line 138, the output from the infrared data receiver 36. This signal is also applied to one input of position latch 128. The second input to position latch 128 is a signal along line 140 indicating the flashing of the display screen after the trigger pull. The output of the trigger latch 126 is applied as one input to the computer 120 via line 142. The output of position latch 128 is likewise applied to the computer 120 via line 144 and also applied to the vertical and horizontal counters 124 and 122 via line 146. The outputs of the counters 122 and 124 are applied to the computer 120 via an OR gate 148 and a line 150. Computer output 152 is applied to the television receiver.

Figure 7:
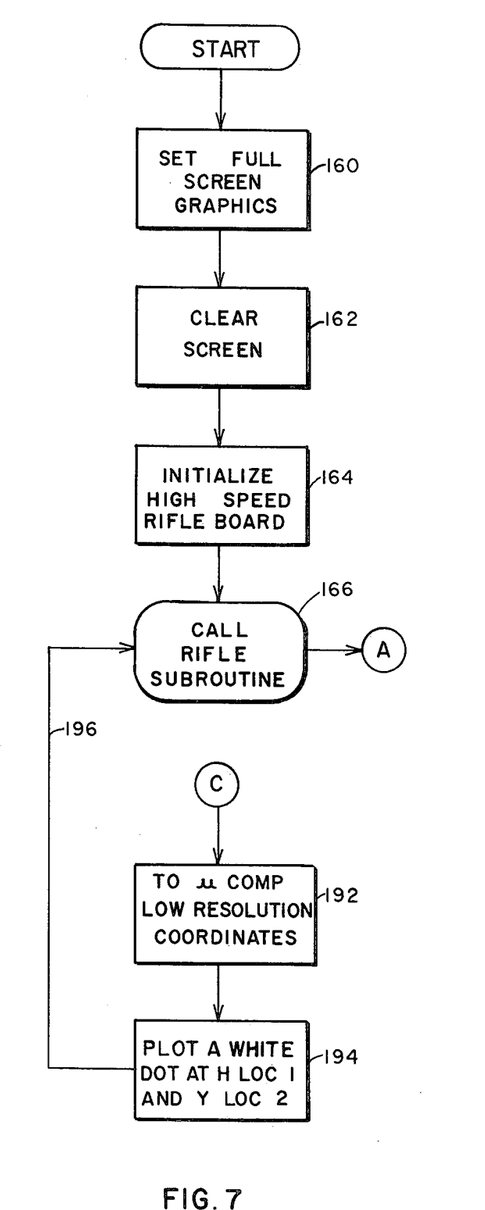
FIGS. 7 through 9 are flow charts of the program employed by the microcomputer used in the embodiment of FIG. 6.

Operation of this portion of the system will be described in conjunction with the block diagram of FIG. 6 and the flow charts of FIGS. 7, 8 and 9. Reference to FIG. 7 shows that the microcomputer 120 is first set for full screen graphics mode at step 160 of the flowchart. The CRT screen of the television receiver 10 is then cleared at step 162 of the flow. At step 166 of the flow, the rifle subroutine of FIG. 8 is then called for.

The first loop 168 of this subroutine looks for a trigger pulse which would be delivered by the IR data receiver 36. Note in FIG. 6 that this pulse is applied to trigger latch circuit 126. This trigger latch circuit recognizes the arrival of a trigger pull. The output of trigger latch circuit 126 alerts the microcomputer 120 via line 142 of the receipt of the trigger pull signal.

Figure 8:
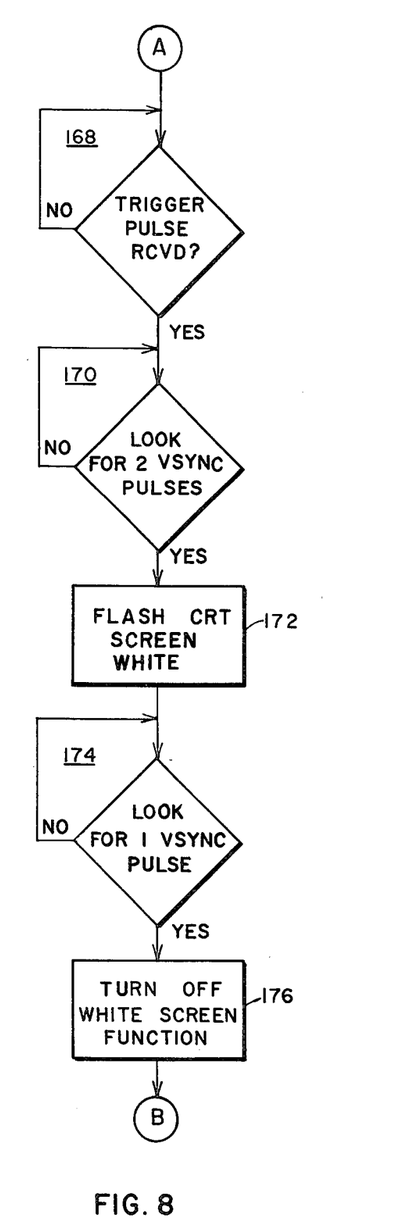

Referring back to the flow chart of FIG. 8, the flow branches to the next block where at loop 170 it looks for two vertical sync pulses and if detected at step 172 of the subroutine, flashes the screen of the television receiver 10 white until the next vertical sync pulse is detected at the loop 174 of this subroutine. Then at step 176 thereof, it turns off the white screen function.

Figure 9:
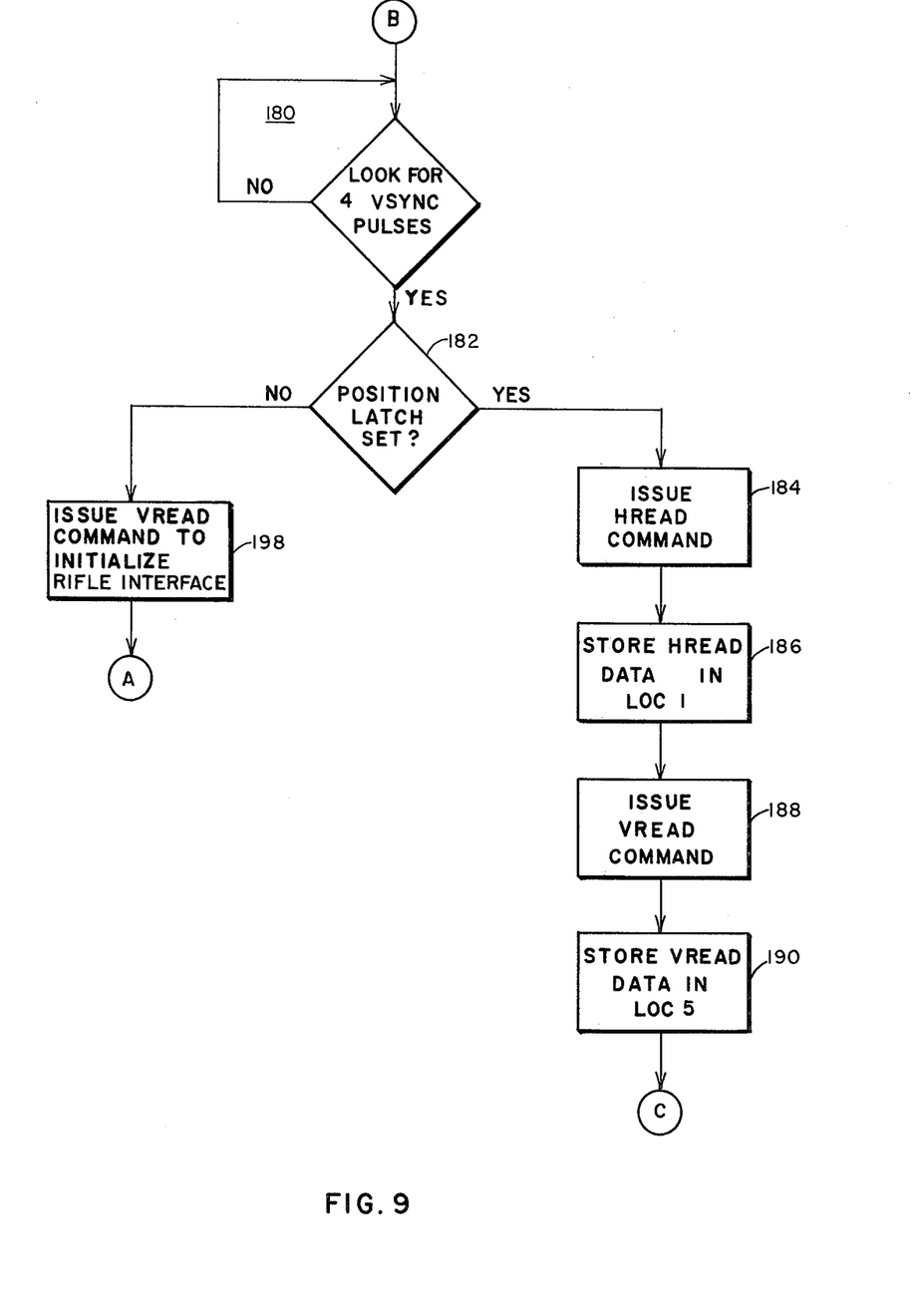

The flow now branches to the routine shown in FIG. 9 and at a loop 180 thereof counts four vertical sync pulses. This is to allow the rifle optics electronics time to settle. The flow then at step 182 monitors the position latch 128 and branches one of two ways depending upon position latch setting. Position latch setting is the function of the hardware of FIG. 6. When the flow of FIG. 8 flashed the screen white it enabled the position latch 128 to monitor position pulses via line 141 coming from the IR Receiver 36. If a position pulse is received via line 141, the position latch 128 performs the following function: it latches the current content of the horizontal counter 122 and the vertical counter 124; it also informs the microcomputer that a position pulse has been received and latched.

Referring again to the flow chart of FIG. 9; the flow takes the yes branch from step 182 and a step 184 issues an H (or X) read command and stores data from the horizontal counter in a first location at step 186. The flow then at step 188 issues a V (or Y) read command and at step 190 stores the information in another location. At this point in time the flow branches to a new position shown in FIG. 7. In step 192 thereof the H read and the V read data are converted to the microcomputer's low resolution coordinates and are plotted at step 194. The call is then made to the rifle subroutine via path 196 where a loop is performed on subsequent trigger pulses.

Referring again to FIG. 9, if a position pulse was not received and latched in position latch, then the software NO branch is taken, and at step 198 a V read command is issued which reinitializes the rifle interface and software branches to the rifle subroutine of FIG. 8 to look for subsequent trigger pulses.

The software for carrying out the flow shown in FIGS. 7 through 9 is set forth hereinafter at the end of this specification. This program is set forth in assembly code and to enter it into the microcomputer (in this embodiment an Apple II) a cross assembler is employed to convert from the assembly language to the machine language code. It is not necessary to go through this program in detail since along with the mnemonics there are various comments to the program user indicating the function of the program instructions. For example, the set full screen graphics of step 160 of the flow chart is disclosed in lines 150 and 160 of the program listing. The call for the rifle subroutine, step 166, is disclosed in line 430 of the program. The flashing of the CRT screen white is disclosed in lines 31 through 32 of the program and the turning off of the white screen function is shown in lines 41 through 42 of the program. The position latch set, step 182 of the flow chart, is illustrated in lines 55 through 56 of the program. The issuance of the H (or X) read command is shown in lines 65 through 69, and the issuance of the V (or Y) read command in lines 82 through 86. Lines 440 through 460 are the converting of the coordinates to the microcomputer low resolution coordinates.

Two embodiments of the invention have been disclosed: one making use of conventional video games, the other making use of a personal computer. Thus, it is to be understood that the embodiments shown are to be regarded as illustrative only and that many variations and modifications may be made without departing from the principles of the invention herein disclosed and defined by the appended claims.

```
LIST
 150 GR
 160 POKE -16302,0: REM    FULL    SCREEN GRAPHICS
 170 COLOR=0
 180 FOR I=40 TO 47
 190 HLIN 0,39 AT I
 200 NEXT I
```

```
205 X=0:Y=0
410 CALL 4608: REM  INITIAL;IZE RIFLE INTERFACE
430 CALL 4352: REM  GET HIT COORDINATES
440 ELEMX= PEEK (1);ELEMY= PEEK (2)
450 COLOR=0: PLOT X,Y
460 X=ELEMX/7:Y=ELEMY
470 COLOR=15: PLOT X,Y
490 GOTO 430
520 END
```

RIFLE INTERFACE......PAGE 0001

```
LINE# LOC  CODE    LINE 0002 0000          ADATA  =$C0B0
0003 0000          ASTAT  =$C0B1
0004 0000          BDATA  =$C0B2
0005 0000          BSTAT  =$C0B3
0006 0000          SET    =$36
0007 0000          RESET  =$3E
0008 0000          COORDX =$01
0009 0000          COORDY =$02
0010 0000          TEMP   =$03
0011 0000          XPOS   =$04
0012 0000          YPOS   =$05

0014 0000                 *=$1100
0015 1100 ADB3C0 TRIGER   LDA BSTAT
0016 1103 3003            BMI *+5
0017 1105 4C0011          JMP TRIGER
0018 1108 ADB2C0 VBL1L    LDA BDATA        ;VBL = VERTICAL BLANKING
                                            PULSE
0019 110B 3003            BMI *+5          ;LOOP UNTIL SET
0020 110D 4C0811          JMP VBL1L
0021 1110 ADB2C0 VBL1H    LDA BDATA        ;WAIT FOR VBL TO GO LOW
0022 1113 1003            BPL *+5
0023 1115 4C1011          JMP VBL1H
0024 1118 ADB2C0 VBL2L    LDA BDATA        ;SKIP ONE FIELD FOR
                                            SYNCHRONIZATION 0025 111B 3003            BMI *+5
0026 111D 4C1811          JMP VBL2L
0027 1120 ADB2C0 VBL2H    LDA BDATA        ;WAIT FOR VBL TO GO LOW
0028 1123 1003            BPL *+5
0029 1125 4C2011          JMP VBL2H 0031 1128 A920            LDA #$20         ;FLASH SCREEN ON
0032 112A 8DF0C0          STA $C0F0
0033 112D A9FF            LDA #$FF         ;SET FLASH INDICATOR
0034 112F 8DB2C0          STA BDATA
0035 1132 ADB2C0 VBL3L    LDA BDATA        ;LEAVE SCREENON FOR ONE
                                            FULL FIELD 0036 1135 3003            BMI *+5
0037 1137 4C3211          JMP VBL3L
0038 113A ADB2C0 VBL3H    LDA BDATA        ;WAIT FOR VBL TO GO LOW
0039 113D 1003            BPL *+5
0040 113F 4C3A11          JMP VBL3H
```

```
0041 1142 A900            LDA #0          ;FLASH SCREEN OFF
0042 1144 8DF0C0          STA $C0F0
0043 1147 A9FE            LDA #$FE        ;RESET FLASH INDICATOR
0044 1149 8DB2C0          STA BDATA
0045 114C A204            LDX #4          ;WIAT FOUR VBL'S FOR OPTICS
                                           TO TURN OFF 0046 114E CA      LOOP    DEX
0047 114F 3013            BMI SLOOP
0048 1151 ADB2C0  VBL4L   LDA BDATA
0049 1154 3003            BMI *+5
0050 1156 4C5111          JMP VBL4L
0051 1159 ADB2C0  VBL4H   LDA BDATA       ;WAIT FOR VBL TO GO LOW
0052 115C 1003            BPL *+5
0053 115E 4C5911          JMP VBL4H
0054 1161 4C4E11          JMP LOOP
0055 1164 ADB1C0  SLOOP   LDA ASTAT       ;POSITION INFO SENT BY IR
                                           LINK ?
```

RIFLE INTERFACE......PAGE 0002

```
LINE# LOC  CODE     LINE 0056 1167 1003             BPL NOHIT
0057 1169 4C7911           JMP HIT 0059 116C A936    NOHIT    LDA #SET       ;RESET TRIGGER WITH YRD/
0060 116E 8DB3C0           STA BSTAT
0061 1171 A93E             LDA #RESET
0062 1173 8DB3C0           STA BSTAT
0063 1176 4C0011           JMP TRIGER 0065 1179 A936    HIT      LDA #SET       ;SET XRD/
0066 117B 8DB1C0           STA ASTAT
0067 117E ADB0C0           LDA ADATA      ;GET X POSITION
0068 1181 49FF             EOR #$FF
0069 1183 8504             STA XPOS
0070 1185 A93E             LDA #RESET     ;RESET XRD/
0071 1187 8DB1C0           STA ASTAT
0072 118A A504             LDA XPOS 0073 118C 38               SEC            ;COORDINATE X =
                                           (X POSITION - 13) * 1.25

0074 118D E930             SBC #48
0075 118F 8503             STA TEMP       ;STORE TEMPORY RESULTS
0076 1191 4A               LSR A          ;DEVIDE BY 4 (TEMP * .25)
0077 1192 4A               LSR A
0078 1193 18               CLC
0079 1194 6503             ADC TEMP       ;.25TEMP + TEMP
0080 1196 8501             STA COORDX     ;BASIC PROGRAM PEEKS THIS
                                           LOCATION 0082 1198 A936             LDA #SET       ;SET YRD/
0083 119A 8DB3C0           STA BSTAT
0084 119D ADB0C0           LDA ADATA      ;GET Y POSITION
0085 11A0 49FF             EOR #$FF
0086 11A2 8505             STA YPOS
0087 11A4 A93E             LDA #RESET
```

```
                                                ;RESET YRD/,TRIGGER,POSITION UPDATE
0088 11A6 8DB3C0          STA BSTAT
0089 11A9 A505            LDA YPOS
0090 11AB 38              SEC              ;COORDINATE Y =
                                           (Y POSITION - 39) / 4
0091 11AC E927            SBC #39
0092 11AE 4A              LSR A            ;DEVIDE BY 4 FOR LOW RES
0093 11AF 4A              LSR A
0094 11B0 8502            STA COORDY       ;BASIC PROGRAM PEEKS THIS
                                            LOCATION
0096 11B2 60              RTS              ;RETURN TO BASIC PROGRAM
0097 11B3                 *=$1200
0098 1200 A900            LDA #$00         ;INITIALIZE RIFLE INTERFACE
0099 1202 8DB1C0          STA $COB1
0100 1205 8DB0C0          STA $COB0
0101 1208 8DB3C0          STA $COB3
0102 120B A901            LDA #$01         ;SET PB0 AS OUTPUT
0103 120D 8DB2C0          STA $COB2
0104 1210 A93E            LDA #$3E         ;SET CA1 HIGH
0105 1212 8DB1C0          STA $COB1
0106 1215 A936            LDA #$36         ;ISSUE VREAD INIT PULSE
0107 1217 8DB3C0          STA $COB3
0108 121A A9FE            LDA #$FE         ;SET PB0 LOW (POSITION
                                            PULSE ENABLE)
0109 121C 8DB2C0          STA $COB2
0110 121F A93E            LDA #$3E

RIFLE INTERFACE......PAGE 0003

LINE# LOC CODE    LINE 0111 1221 8DB3C0          STA $COB3
0112 1224 60              RTS
0113 1225                 .END

ERRORS = 0000 <0000>

SYMBOL TABLE

SYMBOL    VALUE

ADATA   C0B0    ASTAT   C0B1    BDATA   C0B2
BSTAT   C0B3    COORDX  0001    COORDY  0002
HIT     1179    LOOP    114E    NOHIT   116C
RESET   003E    SET     0036    SLOOP   1164
TEMP    0003    TRIGER  1100    VBL1H   1110
VBL1L   1108    VBL2H   1120    VBL2L   1118
VBL3H   113A    VBL3L   1132    VBL4H   1159
VBL4L   1151    XPOS    0004    YPOS    0005

END OF ASSEMBLY
```

I claim:

1. Apparatus for shooting at targets displayed on the screen of a raster scan display, comprising:
a simulated weapon having means for sensing at a distance brightened raster scan segments on the screen of a raster scan display and trigger means; and
means responsive to a trigger pull for generating a signal to brighten the raster to thereby permit said simulated weapon to sense brightened raster scan segments.

2. Apparatus as defined in claim 1, wherein said sensing means includes an electro-optical sensor responsive to brightened raster scan segments.

3. Apparatus as defined in claim 2, further including means coupled to said electro-optical sensor for coupling signals associated therewith to said means responsive.

4. Apparatus as defined in claim 3, wherein said coupling means includes an infrared transmitter and receiver.

5. Apparatus as defined in claim 4, wherein said transmitter includes a photo diode.

6. Apparatus as defined in claim 4 wherein said receiver includes a photo-responsive element.

7. Apparatus as defined in claim 1, further including means responsive to sensed, brightened raster scan segments for generating signals resolving the location on the screen of the sensed, brightened segments.

8. Apparatus as defined in claim 7, further including means for generating signals to display a symbol on the screen at the resolved location thereby indicating where the weapon was aimed.

9. A method of shooting at targets displayed on the screen of a raster scan display with a simulated weapon having a trigger and electro-optical sensing means, comprising the steps of:
aiming at the displayed target;
pulling the trigger;
brightening the display screen; and
sensing short segments of the brightened display raster.

10. The method of claim 9, further including the step of determining the position of the sensed short segments of the brightened display raster.

11. The method of claim 10, further including the step of displaying a symbol at the determined position thereby indicating where the weapon was aimed.

12. Apparatus for shooting at targets displayed on the screen of a raster scan display, comprising:
means for optically sensing short segments of a displayed television raster, said sensing means including an electro-optical sensor, switching means and means responsive to said switching means for enhancing the brightness of the raster such that said electro-optical sensor will respond thereto; and
means coupled to said sensing means for resolving which of the raster segments were sensed thereby permitting a determination of where on the screen said sensing means was directed.

13. Apparatus for shooting at targets displayed on the screen of a raster scan display, comprising:
means for optically sensing short segments of a displayed complete television raster, said sensing means including an electro-optical sensor, switching means and means responsive to said switching means for enhancing the brightness of the raster such that said electro-optical sensor will respond thereto; and
means coupled to said sensing means for resolving which of the raster segments were sensed thereby permitting a determination of where on the screen said sensing means was directed.

* * * * *